United States Patent
Brunner et al.

(10) Patent No.: US 7,448,674 B2
(45) Date of Patent: Nov. 11, 2008

(54) DEVICE FOR ABSORBING LATERAL FORCES IN A SIDE IMPACT IN A MOTOR VEHICLE

(75) Inventors: Markus Brunner, Pliezhausen (DE); Stephan Brausse, Eningen (DE); Franc Praznik, Leonberg (DE); Roberto Oggianu, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/586,602

(22) Filed: Oct. 26, 2006

(65) Prior Publication Data

US 2007/0095623 A1 May 3, 2007

(30) Foreign Application Priority Data

Oct. 29, 2005 (DE) ....................... 10 2005 051 948

(51) Int. Cl.
*B60J 7/00* (2006.01)
(52) U.S. Cl. ............................. 296/193.02; 296/187.12
(58) Field of Classification Search ............ 296/193.02, 296/187.12, 193.07, 203.03, 29
See application file for complete search history.

(56) References Cited

U.S. PATENT DOCUMENTS

| | | | | |
|---|---|---|---|---|
| 4,671,536 A | * | 6/1987 | Yoshimura | ................... 280/779 |
| 5,238,286 A | * | 8/1993 | Tanaka et al. | .......... 296/193.02 |
| 5,388,885 A | * | 2/1995 | Warren | ................... 296/203.03 |
| 5,921,618 A | * | 7/1999 | Mori et al. | ............. 296/187.12 |
| 5,954,390 A | * | 9/1999 | Kleinhoffer et al. | .... 296/187.12 |
| 6,053,567 A | | 4/2000 | Ito | |
| 6,099,194 A | * | 8/2000 | Durand | ........................ 296/29 |
| 6,129,412 A | * | 10/2000 | Tanuma | ..................... 296/204 |
| 6,168,228 B1 | * | 1/2001 | Heinz et al. | ............ 296/187.12 |
| 6,250,678 B1 | * | 6/2001 | Yoshinaka et al. | ..... 296/193.02 |
| 6,283,539 B1 | * | 9/2001 | Enning et al. | .......... 296/203.03 |
| 6,296,303 B1 | * | 10/2001 | Kamiya et al. | ......... 296/193.02 |
| 6,644,690 B2 | * | 11/2003 | Brownlee et al. | ............. 296/72 |
| 6,685,259 B1 | * | 2/2004 | Shimase et al. | ........ 296/193.02 |
| 7,118,167 B2 | * | 10/2006 | Nakamura et al. | ..... 296/193.07 |
| 7,150,489 B2 | * | 12/2006 | Yoshida et al. | ......... 296/193.02 |
| 7,237,833 B1 | * | 7/2007 | Moll | ..................... 296/203.04 |
| 2002/0068521 A1 | * | 6/2002 | Tanaka et al. | ................ 296/188 |
| 2002/0153749 A1 | * | 10/2002 | Lee | ............................ 296/204 |
| 2002/0180244 A1 | * | 12/2002 | Kosuge et al. | .............. 296/204 |
| 2004/0195818 A1 | | 10/2004 | Borke et al. | |
| 2005/0110302 A1 | * | 5/2005 | Riha et al. | ............. 296/193.02 |
| 2005/0134090 A1 | * | 6/2005 | Kring et al. | ............. 296/193.02 |

(Continued)

FOREIGN PATENT DOCUMENTS

DE 102004012500 A1 10/2005

(Continued)

OTHER PUBLICATIONS

European search report dated Feb. 8, 2007 citing above documents.

*Primary Examiner*—Kiran B. Patel
(74) *Attorney, Agent, or Firm*—Crowell & Moring LLP

(57) ABSTRACT

To effectively absorb a side impact in a motor vehicle, a transverse modular unit is provided in the vehicle. This unit includes a beam element and profile parts arranged on ends of the beam element.

11 Claims, 5 Drawing Sheets

U.S. PATENT DOCUMENTS

| | | | |
|---|---|---|---|
| 2006/0017309 A1* | 1/2006 | Wolf | 296/193.02 |
| 2007/0052260 A1* | 3/2007 | Lassl et al. | 296/187.12 |
| 2007/0063543 A1* | 3/2007 | Roccato et al. | 296/187.12 |
| 2007/0096507 A1* | 5/2007 | Brunner et al. | 296/187.12 |

FOREIGN PATENT DOCUMENTS

| | | |
|---|---|---|
| EP | 0 943 530 B1 | 9/1999 |
| GB | 1060864 | 3/1967 |
| GB | 2262917 A | 7/1993 |
| WO | 00/61424 A1 | 10/2000 |

* cited by examiner

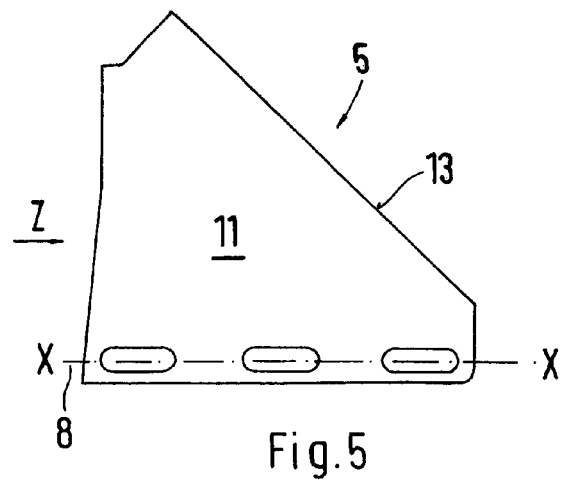
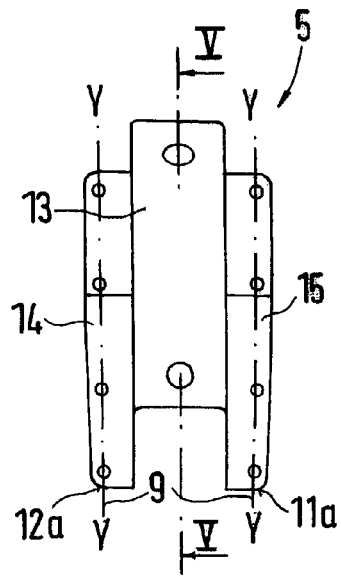
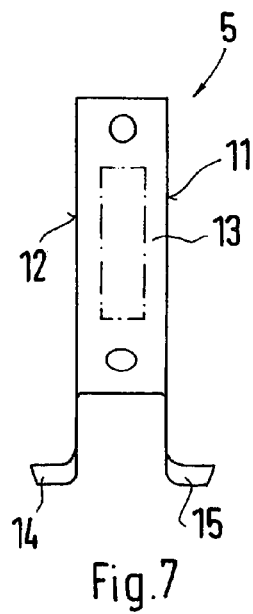
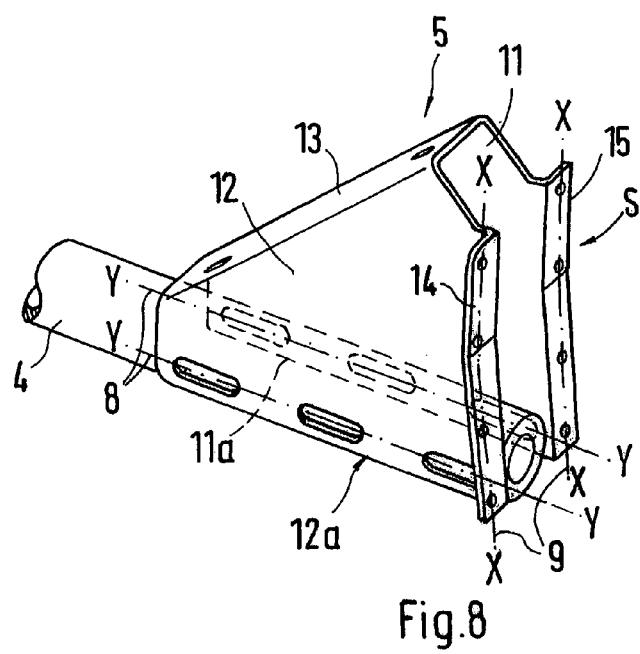

DEVICE FOR ABSORBING LATERAL FORCES IN A SIDE IMPACT IN A MOTOR VEHICLE

This application claims the priority of German application 10 2005 051 948.2, filed Oct. 29, 2005, the disclosure of which is expressly incorporated by reference herein.

BACKGROUND AND SUMMARY OF THE INVENTION

This invention relates to a device for absorbing lateral forces upon a side impact of a motor vehicle having a transverse reinforcing modular unit arranged in a vehicle body in the transverse direction of the vehicle, in which the modular unit includes a transverse beam element and a supporting element connected at each end of the transverse beam element, and in which each supporting element is arranged in an area of a B pillar or a corresponding body area.

European Patent EP 0 943 530 B1 describes a vehicle having a device for absorbing lateral forces in a side impact via a transverse reinforcing modular unit, which consists of a tubular construction having two upright reinforcing tubes on the outside laterally and a tubular reinforcing element running the width of the vehicle body. The upright reinforcing tubes are attached to nodular plates incorporated into the vehicle body.

One object of the patent invention is to create a device in a motor vehicle for side impact protection and/or for absorbing lateral forces such that it will ensure optimum lateral force absorption and permit simple assembly, so that a targeted introduction of force into the vehicle body is made possible and optimum occupant protection is achievable.

This object is achieved according to this invention way of a supporting element which includes a profile part protruding upward in a vertical plane from the transverse beam element, with the profile part including first horizontal fastening sections and second vertical fastening sections, attached via the first horizontal fastening sections on the beam element, and attachable to an interior connecting part held on the vehicle chassis via the second vertical fastening sections. Additional advantageous features are also claimed.

A primary advantage achieved by the inventive device is that, in the event of a side impact and/or with forces acting laterally on a vehicle in the area of a B pillar or an area of the body behind a door cutout, the vehicle is additionally reinforced in this area, so that the occupants are protected in a crash or the like and this area of the body cannot be deformed inwardly to such an extent that the occupants are injured. According to this invention, this is achieved by having the supporting element be a profile part extending upward in a vertical plane from the beam element running transversely. The profile part is attached to the beam element via first adjusted fastening sections, and with second fastening sections, the profile part is attached to an interior connecting part secured inside on the vehicle body. According to this invention, the profile part is designed in the shape of a box and has two side walls connected via a connecting web. The walls are opposite one another at a distance, and the first fastening sections are arranged to run horizontally on each of the side walls and accommodate the beam element between them. Due to this design of the profile part, side impact forces can be transmitted optimally to the transverse beam element, which may be designed as a tube or as a sheet metal beam of any geometric shape.

The profile part is fastened to the transverse beam element as well as to the vehicle body via relatively long fastening sections so that separation is prevented. According to this invention, the profile part has the second fastening sections on its side walls in a vertical plane, and the second fastening sections are designed as bent legs on the side walls and fixedly attached to the connecting part of the vehicle body extending in the longitudinal direction of the vehicle.

The profile part is attached to a wall of the beam part with its first fastening sections, and a lower border of the fastening sections is arranged at least in the area between a lower bordering plane and an upper bordering plane of the beam part arranged above that. In order for the profile part not to protrude downward toward the beam element, resulting in a deformation that might possibly have a negative effect on the transverse beam element, the profile part with its first horizontal fastening sections is attached to the end tube section at least in a central transverse plane of the tube or below that plane, so that the end edges of the profile part go beyond the transverse central plane of the tube and end before a lower tube transverse plane bordering the tube and/or the beam element toward the bottom. As a result, no area of the profile part extends beneath the beam element, thus ensuring that a lever arm is formed only upward via the profile part that extends upward, and the beam element is deformed accordingly, absorbing energy, ensuring a survival space up to a certain height of the lateral force.

The beam element is a transverse tube. One end tube section on each side of the vehicle is attached to the profile part, and another connected transverse central tube section is attached to the end tube section via a sliding sleeve. The tube of the beam element may have a polygonal, round, ellipsoidal, or similar cross-sectional shape. The beam element may also be integrated as a beam into the undercarriage of the vehicle body or attached as a welded or riveted beam.

In order for the lateral forces to be absorbed optimally in a specified side impact situation, the profile part which is fixedly attached to the connecting part of the vehicle body is arranged above a vehicle side reinforcement and at a distance from a lateral outside wall of the vehicle body. The connecting part is attached at one end to a shaped sheet metal part forming a side reinforcement and at the other end to an inside wall of the vehicle body.

For adaptation to a vehicle having a central tunnel, the central tube section has a trapezoidal area extending beyond a central tunnel of the vehicle body, and the connected tube sections, extending transversely, are situated at a lower level and run coaxially with the end tube sections. When a lateral force is to be absorbed, the transverse tube sections and/or beam element sections may be supported partially on the central tunnel over the trapezoidal area so that the transverse beam element with a profile part does not break through to the other side of the vehicle.

An exemplary embodiment of the invention is illustrated in the drawings and described in greater detail below.

BRIEF DESCRIPTION OF THE DRAWINGS

FIG. 5 shows a section through the profile part as seen along line V-V in FIG. 6, FIG. 6 shows a front view of the profile part as seen in direction Z in FIG. 5, FIG. 7 shows a top view of the profile part, and FIG. 8 shows a schematic diagram of the profile part attached to the beam element.

DETAILED DESCRIPTION OF THE INVENTION

Figure 1:
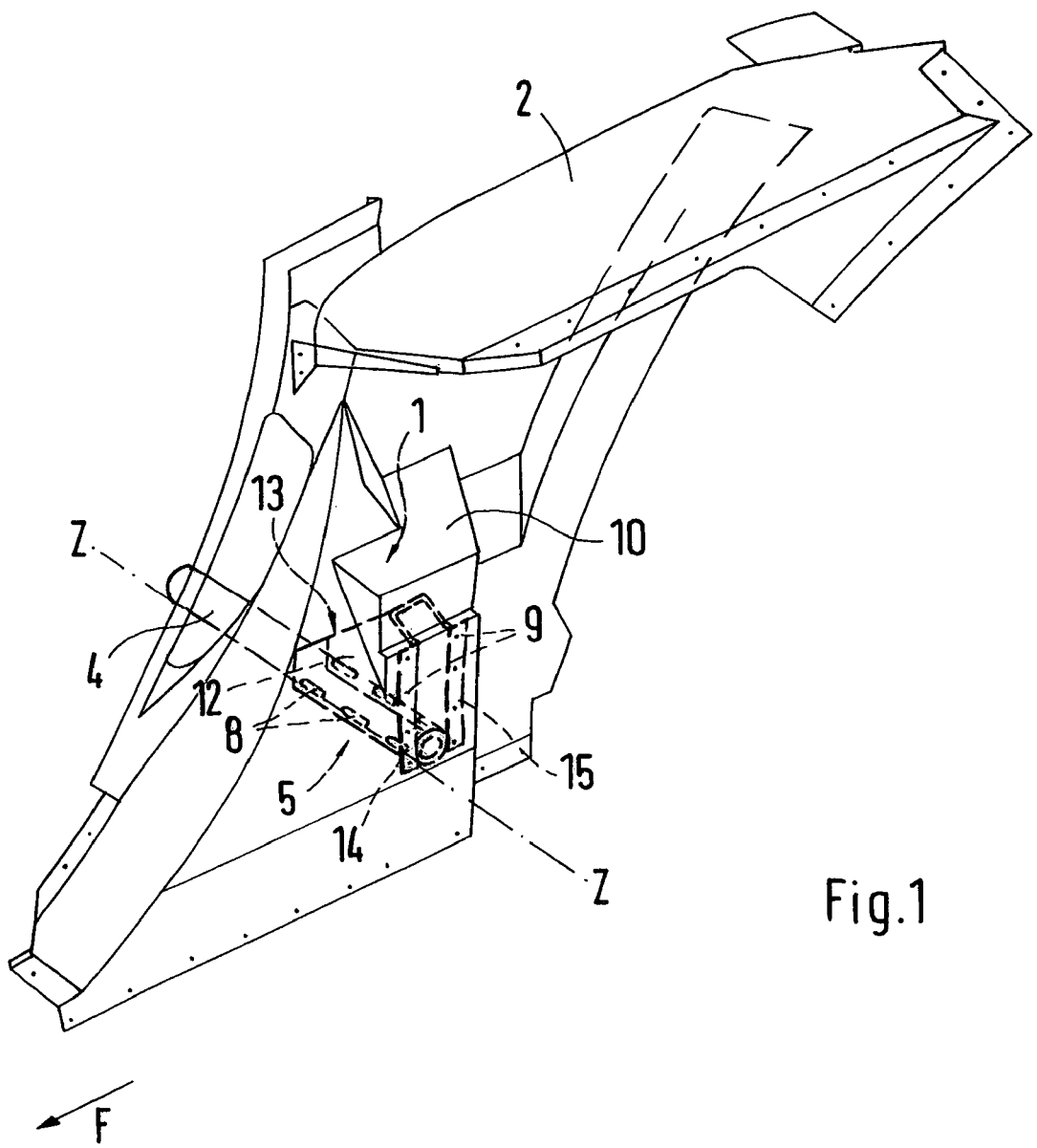
FIG. 1 shows a schematic diagram of a device having a beam part and a profile part in the vehicle body (as seen partially from the outside toward the vehicle)
Figure 2:
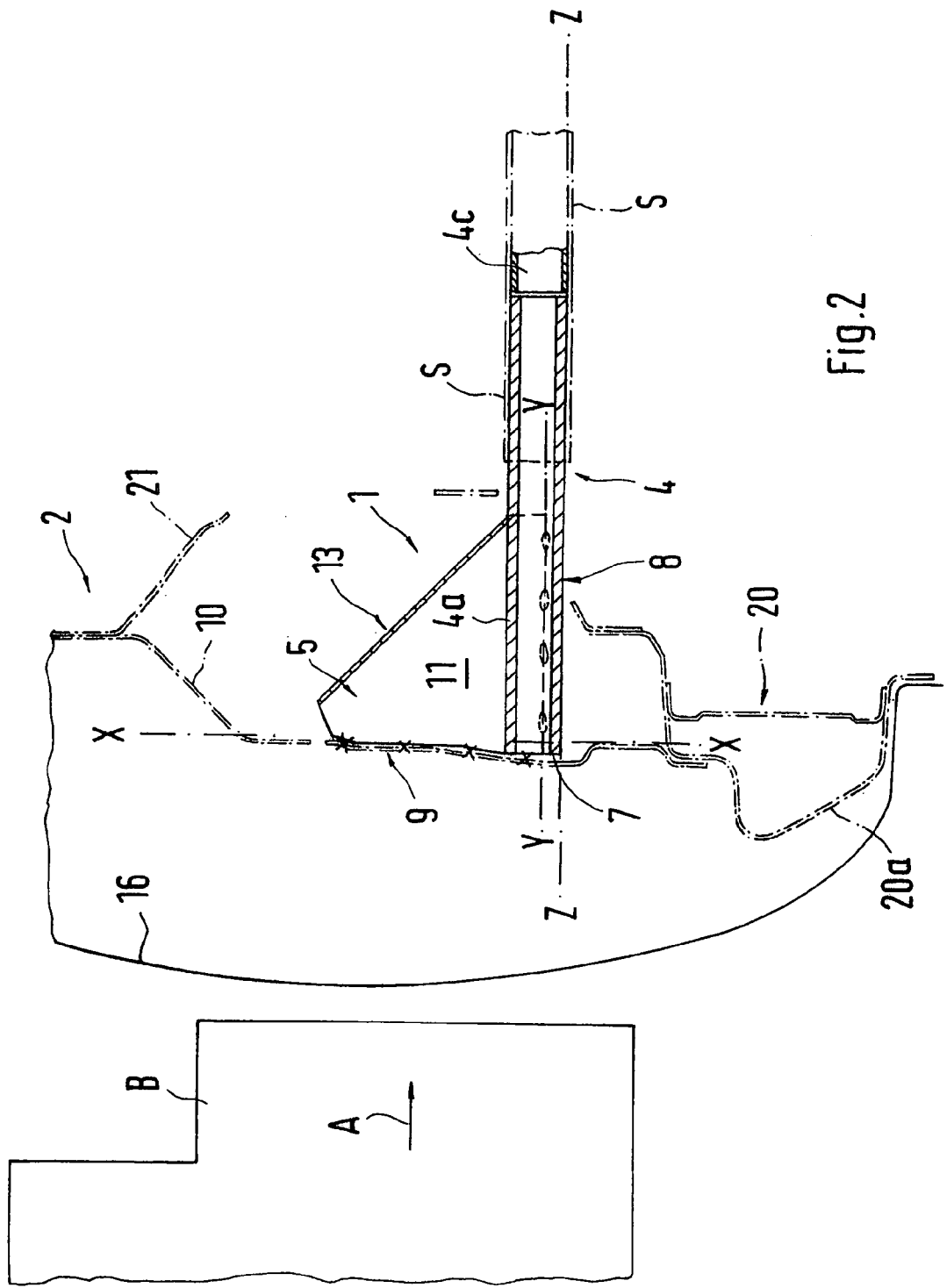
FIG. 2 shows a vertical section through the device.

A device 1 for absorbing side impact forces in the direction of an arrow A in FIG. 2 (the direction of force is represented symbolically) comprises essentially a beam element 4 running transversely in the vehicle body 2 of the vehicle 3 and a profile part 5 that is connected to the former and is attached at each end to the beam element 4. The beam element 4 may be attached to the vehicle undercarriage and may have a shape adapted to the undercarriage, in particular over a central tunnel 6, to which end the beam element 4 has a corresponding contour with a trapezoidal jump T corresponding thereto.

The device 1 is designed so that a survival space for the occupants remains in the event of a side impact at a predetermined force. In other words, the device 1 is preferably arranged in the area of a B pillar and/or in a corresponding area of the vehicle which need not necessarily have a pronounced B pillar.

The beam element 4 consists of a tube having a round cross section in the example illustrated here. Beam elements 4 consisting of tubes having a polygonal shape or other geometric cross sections, e.g., ellipsoidal or the like, are also conceivable. The beam element 4 may also be assembled from sheet metal parts that yield a sheet metal beam which may consist of an open or closed profile. Energy absorbing corrugated pipes and the like are also possible according to this invention.

The profile part 5 of the device 1 consists of a so-called supporting element which protrudes only upward from a transverse beam element 4 in a vertical plane and ends with a free end 7 of the beam element 4. By means of the first and second fastening sections 8 and 9 on the profile part 5, a connection to the beam element 4 is established via the first fastening section 8, and a connection to a connecting part 10 of the vehicle body 2 of the vehicle 1 is established via the second fastening section 9; this connecting part may be part of a B pillar and serves mainly to position the device 1 in the vehicle.

The profile part 5 is designed to be approximately box-shaped and includes two side walls 11 and 12 arranged with a distance between them, connected to one another at the head end by a web 13. The profile part 5 is designed to be triangular as seen from the side, with the web 13 designed to run obliquely and tapering toward the beam element 4, as also shown in detail in FIG. 8.

The side walls 11, 12 of the profile part 5 reach around the beam element 4 peripherally from the outside, as depicted in the exemplary embodiment shown here with a tube, and the side walls 11, 12 are attached to the tube 4 by means of first fastening sections 8 running in a horizontal plane Y-Y by welding or similar methods. The second fastening sections 9 are provided in a vertical plane X-X on an end face of the profile part 5, this plane consisting of legs 14, 15 that lead away from the side walls 11, 12 and are fixedly attached to the connecting part 10 of the vehicle body 2. The connecting part 10 is designed as a sheet metal part aligned in the longitudinal direction of the vehicle and arranged at a distance from the outside side wall 16 of the vehicle 3 in the transverse direction of the vehicle.

The side walls 11, 12 end with their lower edges 11a, 12a either in front of or in a lower bordering plane Z-Z of the beam element 4 and/or the tube or above it.

The two fastening sections 8 and 9 are arranged approximately at right angles to one another so that there can be an optimum uptake of force in the event of a side impact. FIG. 2 shows a barrier B with which a side impact with the vehicle 3 is simulated.

In the exemplary embodiment shown here, the beam element 4, which is designed as a tube, is subdivided for the purpose of assembly. Thus, the end tube sections 4a and 4b are attached to the profile part 5 on each side of the vehicle. A central tube section 4c of the device 1 is fixedly attached to each of the end tube sections 4a, 4b via a sliding sleeve S, which is pushed over the end tube sections 4a, 4b after assembly of a side part of the vehicle on the remaining vehicle body and then is welded in place.

Figure 3:
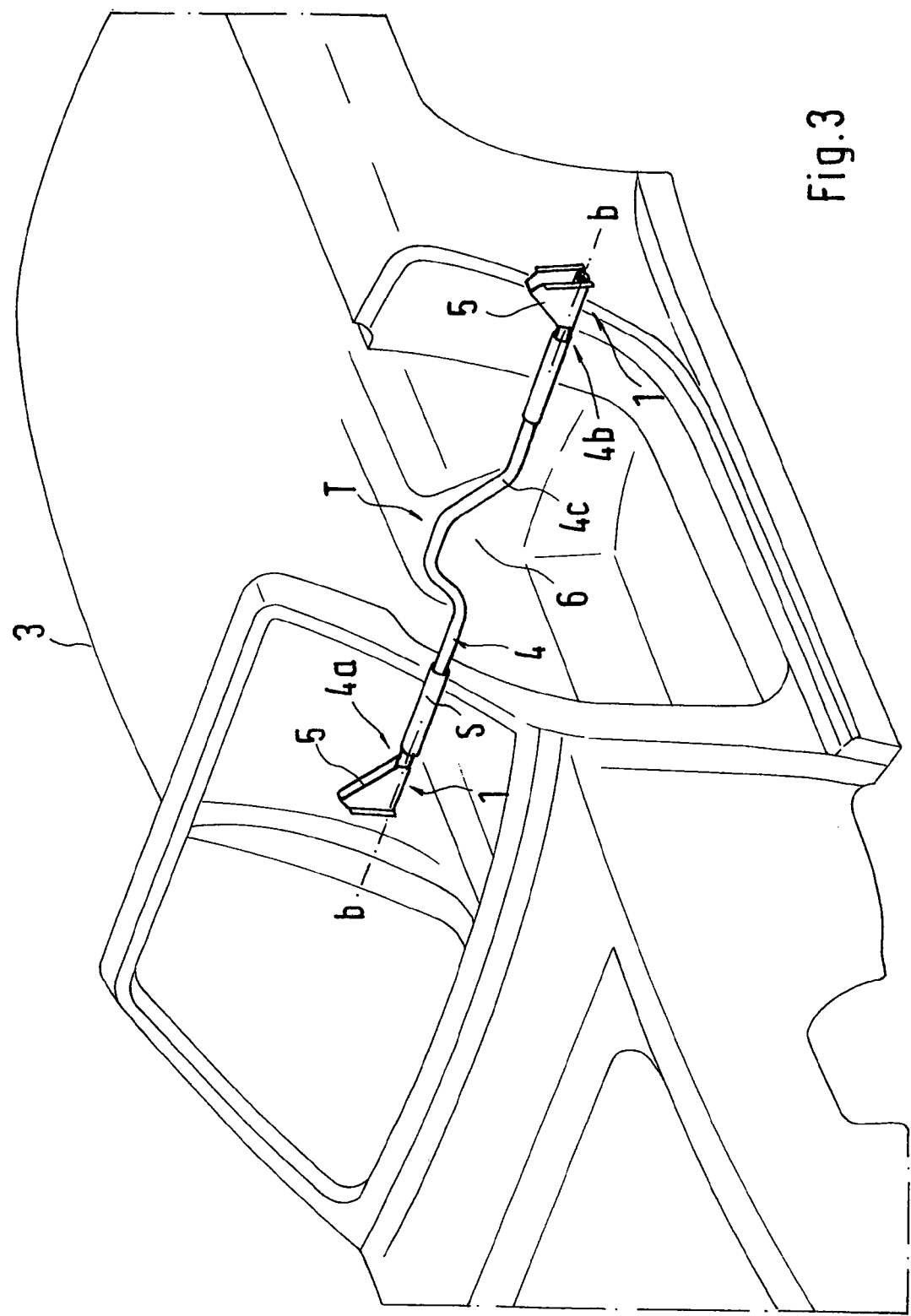
FIG. 3 shows a schematic overall view of the device having a transverse beam element and profile parts on the end.
Figure 4:
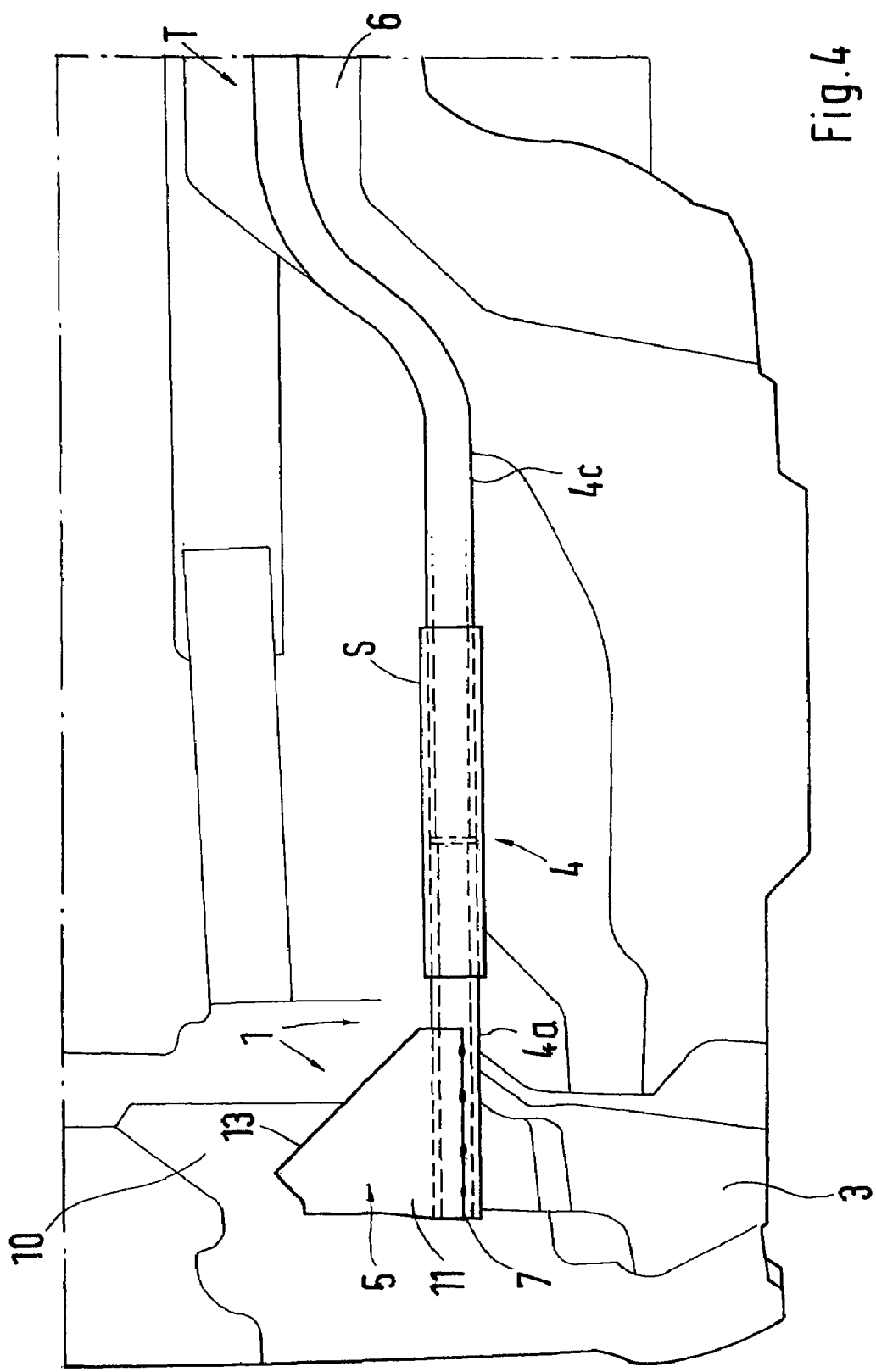
FIG. 4 shows an enlarged diagram of one end of the device having a sliding sleeve.

As shown in detail in FIGS. 2 and 3, the device 1 is arranged with the profile part 5 and the beam element 4 above a side reinforcement 20 of the vehicle, whereby the connecting part 10 is held on the side reinforcement 20 and on an inside wall 21 of the vehicle body. The central tube section 4c extends beyond the central tunnel of the vehicle body 2 and is designed to be approximately trapezoidal in this area, and the connecting areas of the tube sections, in particular 4a and 4b as well as the areas of the central tube section 4c are situated at a lower level and are arranged so they run coaxially with the end tube sections 4a and 4b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A device for absorbing lateral forces in a side impact of a motor vehicle having a transverse reinforcing modular unit arranged in a vehicle body in the transverse direction of the vehicle, said modular unit comprising:

a transverse beam element, and a supporting element connected at each end of said transverse beam element, each supporting element being arranged in an area of a B pillar or a corresponding body area, wherein the supporting element includes a profile part protruding upward in a vertical plane from the transverse beam element, wherein said profile part comprises first horizontal fastening sections and second vertical fastening sections, wherein the profile part is attached via the first horizontal fastening sections on the beam element, wherein the profile part is attachable to an interior connecting part held on the vehicle chassis via the second vertical fastening sections, wherein the profile part is designed to be approximately box shaped and consists of two side walls connected via a connecting web, wherein the side walls are located opposite one another at a distance, wherein the first fastening sections which are arranged in a horizontal plane are each also arranged on the side walls and hold the beam element between them, wherein the profile part has, on its side walls in a vertical plane, the second fastening sections, and wherein the second fastening sections are designed by the side walls as bent legs and are attached to a connecting part of the vehicle body extending in the longitudinal direction of the vehicle.

2. The device as claimed in claim 1, wherein the profile part is attached to walls of the beam element with the first fastening sections, and wherein a lower border of the first fastening sections is arranged at least in an area between a lower bordering plane and an upper bordering plane of the beam part arranged above it.

3. The device as claimed in claim 2, wherein the profile part is designed as a shaped sheet metal part and with a U profile in cross section, wherein the first fastening sections form approximately a right angle to the second fastening sections, and wherein the connecting web between the two side walls runs with an acute angle to the first fastening sections that are connected.

4. The device as claimed in claim 2, wherein the profile part is attached with its first horizontally running fastening sections to an end tube section at least near a central transverse plane of the tube, and wherein end edges of the profile part extend beyond the central transverse plane of the tube and end before a lower transverse plane of the tube.

5. The device as claimed in claim 1, wherein the profile part is designed as a shaped sheet metal part and with a U profile in cross section, wherein the first fastening sections form approximately a right angle to the second fastening sections, and wherein the connecting web between the two side walls runs with an acute angle to the first fastening sections that are connected.

6. The device as claimed in claim 5, wherein the profile part is attached with its first horizontally running fastening sections to an end tube section at least near a central transverse plane of the tube, and wherein end edges of the profile part extend beyond the central transverse plane of the tube and end before a lower transverse plane of the tube.

7. The device as claimed in claim 1, wherein the profile part is attached with its first horizontally running fastening sections to an end tube section at least near a central transverse plane of the tube, and wherein end edges of the profile part extend beyond the central transverse plane of the tube and end before a lower transverse plane of the tube.

8. The device as claimed in claim 7, wherein the beam element consists of a tube, wherein an end tube section at each vehicle side is attached to the profile part, and wherein another connected transverse central tube section is connected by sliding sleeves to the end tube sections.

9. The device as claimed in claim 8, wherein the central tube section has a trapezoidal area extending beyond a central tunnel of the vehicle body, and wherein the end tube sections, extending transversely, as well as tube sections attached to the trapezoidal area are arranged at a lower level in a plane and run coaxially with the end tube sections.

10. The device as claimed in claim 1, wherein each profile part connected with the connecting part of the vehicle body is held above a vehicle side reinforcement and at a distance from a lateral outside wall of the vehicle body.

11. The device as claimed in claim 1, wherein the connecting part is connected at one end to a shaped sheet metal part that contributes to forming a side reinforcement and at the other end to an inside wall of the vehicle body.

* * * * *